Figure 2:
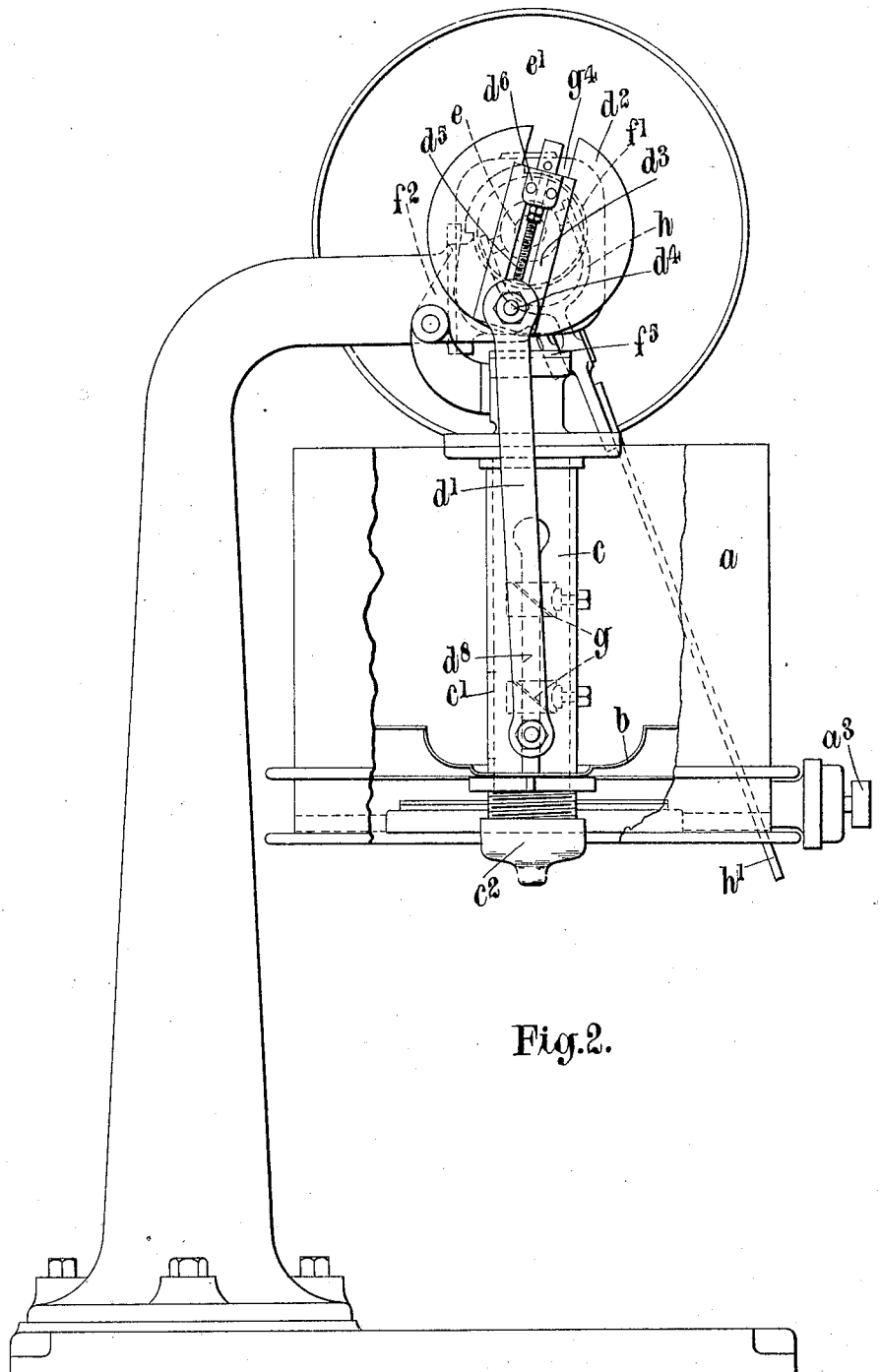

Jan. 15, 1929. 1,699,447
W. E. PRESCOTT
MACHINE FOR DEPOSITING PLASTIC OR SEMILIQUID
SUBSTANCES SUCH AS CHOCOLATE
Filed Oct. 10, 1927 2 Sheets-Sheet 1
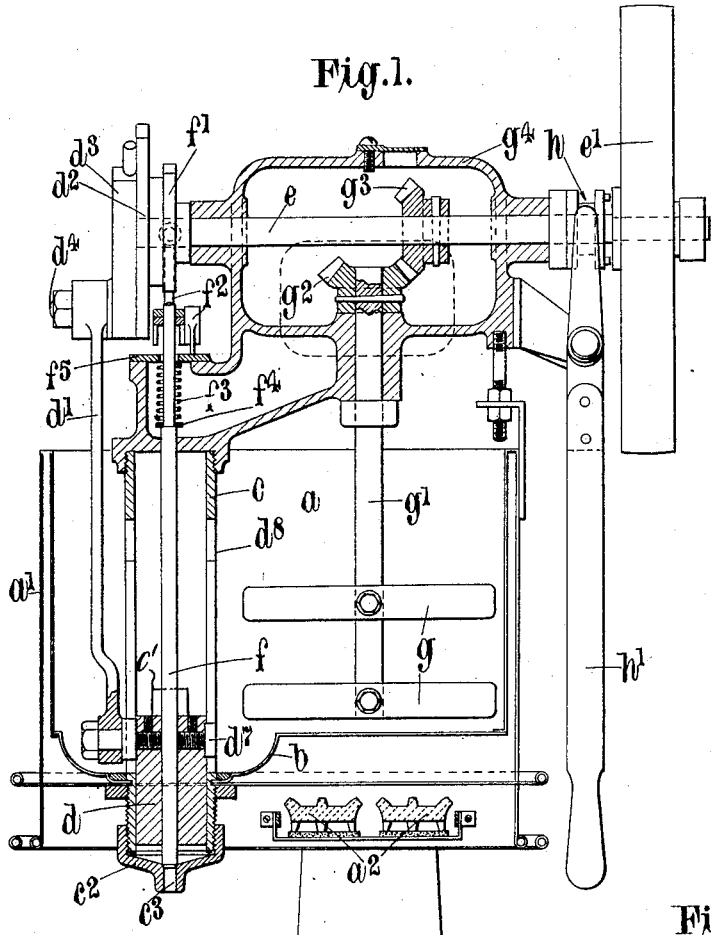
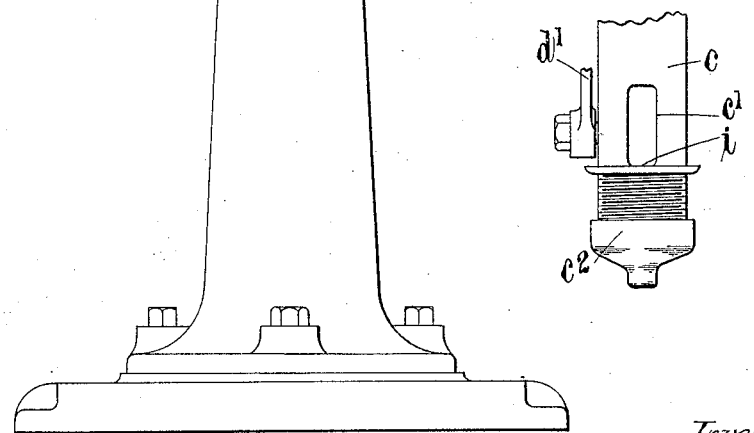
Inventor:
WILLIAM EDWARD PRESCOTT
by his Attorney:

Patented Jan. 15, 1929.

1,699,447

UNITED STATES PATENT OFFICE.

WILLIAM EDWARD PRESCOTT, OF LONDON, ENGLAND, ASSIGNOR TO BAKER PERKINS CO. INC., OF SAGINAW, MICHIGAN.

MACHINE FOR DEPOSITING PLASTIC OR SEMILIQUID SUBSTANCES SUCH AS CHOCOLATE.

Application filed October 10, 1927, Serial No. 225,275, and in Great Britain November 8, 1926.

This invention relates to machines for depositing plastic or semi-liquid substances, such as chocolate, of that type which embodies or includes a container for the substance, a measuring chamber within the container and communicating with the interior thereof, a reciprocating plunger within said chamber adapted to be operated on one stroke to allow a definite or measured quantity of substance from the container to enter said chamber and on the opposite stroke to expel said substance through a depositing or discharge orifice or nozzle, and a valve operating in timed relation with the plunger for opening and closing said orifice or nozzle at the required times.

The principal feature of the invention comprises a construction in which the plunger in its movements opens and closes a port or ports through which the substance flows from the container to the measuring chamber and in which the valve is in the form of a rod or equivalent and passes through the plunger.

The invention also comprises improved actuating and controlling means for the plunger and valve whereby the movements of these elements are controlled in required time relation by independent actuating means one or both of which is capable of adjustment to ensure or vary said time relation according to requirements. The invention further comprises other features of construction, arrangement and combination of parts as hereinafter fully described.

In the accompanying drawings Fig. 1 is a front elevation of the improved machine with parts in section; Fig. 2 is a side elevation with the container broken away, and Fig. 3 is a detail view of part of the measuring chamber.

In the following description the substance to be deposited will be referred to as chocolate, for which the present embodiment is particularly adapted, but it will be obvious that any other plastic, semi-fluid or moistened substances can be equally well dealt with.

In said drawings, $a$ designates a container for the chocolate suitably provided with a double wall $a^1$ and having a double bottom containing electric heating devices $a^2$ controlled as by a switch $a^3$ for varying the degree of heat. A jacket for containing a tempering medium such as warm water could be used in place of the heating means described.

The base of the container is shown as depressed at $b$ for leading the chocolate to a port or ports $c^1$ in the wall of a tubular measuring chamber $c$ which may extend the full height of the container and is fitted below with a screw cap $c^2$ provided with a discharge orifice or nozzle $c^3$. Within the measuring chamber $c$ is a plunger $d$ actuated by a connecting rod $d^1$ adjustably connected to a crank disk $d^2$ mounted on a main driving shaft $e$ driven as by pulley $e^1$. The adjustable connection of the rod $d^1$ may as shown in Fig. 2, comprise a slotted guide $d^3$ carried by the disk $d^2$, in which guide may slide the pivot $d^4$ of the connecting rod under the action of a screw spindle $d^5$ working within a bearing or block $d^6$. Any other suitable means may however be used. The plunger is guided in its movements by blocks $d^7$ working in slots $d^8$ in the wall of chamber $c$.

Extending through the chamber $c$ and plunger $d$ is a valve $f$ in the form of a rod operated by a cam $f^1$ on driving shaft $e$ and a bell crank lever $f^2$ interposed between said cam and valve. Any convenient means for adjusting the stroke of the valve may be provided if desired. The valve is opened by the cam and closed by a spring $f^3$ coiled about its upper end and bearing against a pin $f^4$ and frame part $f^5$.

The device shown is completed by stirring arms or members $g$ within the container $a$, these arms being mounted on a shaft $g^1$ driven through bevel gears $g^2$ $g^3$ from the shaft $e$, the gears being housed in a casing $g^4$ for protection and purposes of lubrication. The operation of the apparatus may be controlled by a clutch or coupling $h$ in shaft $e$ controlled by hand lever $h^1$.

With the parts in the position shown in Figs. 1 and 2, the plunger $d$ is at the lower end of its stroke and the valve $f$ is closed. On the upstroke of the plunger and when it rises above the inside level of the container at the point $i$, that is, when the port or ports $c^1$ are exposed, the chocolate flows into the measuring chamber $c$ through said port or ports, the valve remaining closed during such movement of the plunger. When the plunger again descends to the point $i$ on its downward stroke, the valve $f$ is caused to open, and further movement of the plunger discharges the measured contents in chamber $c$ through the orifice $c^3$. Immediately the plunger commences its upstroke, the valve is again closed.

What I claim as my invention and desire to secure by Letters Patent of the United States is:—

1. A depositing machine comprising a container, a measuring cylinder within the container having a lateral entrance port intermediate its ends through which the substance to be deposited may pass from the container directly into the measuring chamber and also having an outlet in its end, a plunger movable in said cylinder, the stroke of said plunger extending from above the aforesaid port to near the outlet end of said cylinder, and a valve rod movable through the plunger in opposite directions into and out of position to close said outlet.

2. A depositing machine comprising a container, a measuring cylinder having a lateral entrance port intermediate its ends through which the substance to be deposited may pass from the container to the measuring chamber and also having an outlet in its end, a plunger movable in said cylinder, the stroke of said plunger extending from above the aforesaid port to near the outlet end of said cylinder, a valve rod for the said outlet passing through the plunger, a crank disk, a connecting rod for said plunger adjustably mounted on said crank disk, a cam for operating said valve in one direction, a spring for retracting said valve, and a common driving shaft on which said disk and cam are mounted.

3. A depositing machine comprising a container, a measuring cylinder having a lateral entrance port intermediate its ends through which the substance to be deposited may pass from the container to the measuring chamber and also having an outlet in its end, a plunger movable in said cylinder, the stroke of said plunger extending from above the aforesaid port to near the outlet end of said cylinder, and a valve rod movable through the plunger in opposite directions into and out of position to close said outlet, the measuring chamber being contained within and extending for the entire height of the container and below the same and communicating directly with said container by means of the said entrance port.

4. A depositing machine comprising a container for the substance to be deposited, a measuring chamber in controllable communication therewith and provided at its bottom with a discharge orifice, a plunger working in said chamber for controlling the communication between the latter and the container, a valve rod for said orifice passing through the plunger, a crank disk, a connecting rod for said plunger adjustably mounted on said crank disk, a cam for operating said valve in one direction, a spring for retracting said valve, and a common driving shaft on which said disk and cam are mounted.

In witness whereof I have signed this specification.

WILLIAM EDWARD PRESCOTT.